United States Patent [19]

Richardson

[11] 4,056,648

[45] Nov. 1, 1977

[54] TRANSFERS

[75] Inventor: Anthony George Richardson, Belper, England

[73] Assignee: Denbyware Limited, England

[21] Appl. No.: 688,089

[22] Filed: May 19, 1976

[30] Foreign Application Priority Data

June 16, 1975 United Kingdom ............... 25651/75
July 15, 1975 United Kingdom ............... 29674/75

[51] Int. Cl.[2] ........................... B05D 3/02; B32B 3/10; B32B 7/06; B32B 17/08

[52] U.S. Cl. ..................................... 428/138; 427/152; 427/146; 428/199; 428/202; 428/207; 428/210; 428/305; 428/914; 428/320; 428/438; 428/537

[58] Field of Search ............... 427/262, 267, 256, 280, 427/288, 402, 152, 146; 428/131, 132, 137, 138, 142, 155, 195, 199, 200, 207, 210, 304, 305, 537, 914, 202, 438, 320; 96/36.1, 116

[56] References Cited

U.S. PATENT DOCUMENTS

| | | | |
|---|---|---|---|
| 2,629,679 | 2/1953 | Rathke | 428/914 X |
| 2,655,453 | 10/1953 | Sandberg | 428/914 X |
| 3,015,574 | 1/1962 | Göbel | 428/914 X |
| 3,385,748 | 5/1968 | Neale et al. | 428/914 X |
| 3,442,681 | 5/1969 | Newman et al. | 428/914 X |
| 3,736,137 | 5/1973 | Kaplan | 96/36.1 |
| 3,898,362 | 8/1975 | Blanco | 428/914 X |
| 3,906,138 | 9/1975 | Evensen | 427/146 |
| 3,922,458 | 11/1975 | Lynch | 428/210 |

*Primary Examiner*—Thomas J. Herbert, Jr.
*Assistant Examiner*—R. Eugene Varndell, Jr.
*Attorney, Agent, or Firm*—McDougall, Hersh & Scott

[57] ABSTRACT

Transfers to be applied to ceramic or like materials normally need to be squeegeed vigorously on application to avoid trapping of air or water behind the pattern. This necessity is avoided according to the invention by providing a transfer comprising a base having a surface of soluble adhesive onto an area of which is printed a pattern of one or more glazes, colors or pigments, the pattern area being covered by a consumable cover coat, in which the cover coat is coherent but is provided with a configuration of small apertures over substantially the whole of the pattern area.

1 Claim, 3 Drawing Figures

TRANSFERS

This invention relates to transfers of the type to be applied to a substrate and subsequently fired to obtain a permanent marking of the substrate.

Such transfers are often used in the ceramic industry for application of patterns or marks or origin, and while the invention will be primarily described in relation to transfers for ceramics, it will be appreciated that the invention is more widely applicable, e.g. in the application of printed material to vitreous enamel, glass, or similar substrates.

Transfers for firing are normally printed in one or more glazes, colours or pigments onto a base of decal paper, i.e. paper with a surface of soluble, normally water-soluble, adhesive onto which the glazes, colour or pigments are printed. After printing, the glazes, colours or pigments are dried, if necessary, and then covered with a consumable cover coating, e.g. a xylene-soluble collodion film. In use, the transfer is soaked in water or other solvent to enable the cover coating and glazes, colours or pigments to be removed as a whole from the paper base and applied to the substrate, cover coat normally outwards. The substrate and transfer are then fired and the cover coat is consumed and the glazes, colours or pigments fuse onto or into the substrate to provide permanent marking thereof.

It has long been recognised that great care is necessary in the application of the transfer to the substrate to ensure that no bubbles of water or air are trapped behind the glaze, colour or pigment before firing, because such bubbles, particularly of water, expand and explode due to production of steam as the temperature rises in the preheating stages of firing, and cause damage to the integrity of the glaze, colour of pigment decoration, particularly if a pattern of fine detail is to be applied. Such damage means that the article is substandard and is either a complete reject or a second grade article which commands a much lower price. This trapping of air or water adds significantly to the losses incurred in the production of ceramic goods of this nature. In order to avoid trapping of air or water, the transfers must be subjected to a vigorous squeegeeing action as part of the application procedure, and this in itself may damage the transfer.

In order to assist in the squeegeeing process, it has previously been proposed and practised to introduce a few comparatively large (say 5 mm diameter) holes in the cover coat in the region of areas of solid colour or glaze or no colour or glaze, so that the water does not all have to be shifted to the edge of the transfer for removal from under the cover coat.

It has now surprisingly been discovered that the cover coat does not have to be continuous, even over areas of comparatively fine detail, and that the use of a mesh cover coat enables the removal of air and water to be more easily achieved.

Accordingly, the present invention consists in a transfer comprising a base, normally of paper, having a surface of soluble adhesive onto an area of which is printed a pattern of one or more glazes, colours or pigments, the pattern area being covered by a consumable cover coat, in which the cover coat is coherent but is provided with a configuration of small aperatures over substantially the whole of the pattern area.

The size of the apertures should be such that the fine details of the pattern of glazes, colours or pigments are not lost through them.

As an example, a mesh cover coat can be printed through a mesh size of 21 to the inch, so that the lines of dots coalesce into a mesh leaving apertures where the lines of spaces cross.

Where the pattern of glazes, colours or pigments has regions of fine detail and regions of less fine detail or no detail, it is proposed to use a half-toning technique, so that the size of the apertures in the regions can be related to the size of the pattern detail. The screen for printing such a cover coat would be prepared by a photographic tecnique.

As an alternative to a mesh printing, areas without fine detail of patterns may be apertured by piercing through the cover coat and colour, pigment or glaze, with fine needles. This may be achieved by a process of kiss-cutting when the base is being cut to shape.

Around the periphery of the pattern area, the cover coat is preferably provided with a continuous area to strengthen it for handling purposes.

By using such an apertured cover coat, the removal of water and air during application of the transfer to the substrate is much facilitated, it being only necessary to flatten the cover coat into conformity with the substrate and apply absorbent material, such as an absorbent paper tissue, to the apertured areas, with no squeegeeing action being required. It has also been found that the use of an apertured cover coat improves the flexibility of the transfer for application to nonflat surfaces and particularly to surfaces having a complex curvature to which the application of flat, less flexible, transfers is not geometrically possible without creasing or stretching.

The invention further consists in the method of applying a decorative pattern to a substrate comprising applying a transfer according to the invention as set forth above, and firing the pattern and substrate.

The invention further consists in a substrate having a decorative pattern applied thereto by a method according to the invention as set forth above.

The invention will be further described with reference to the accompanying drawing, which shows preferred forms of the invention, and in which.

Figure 1:
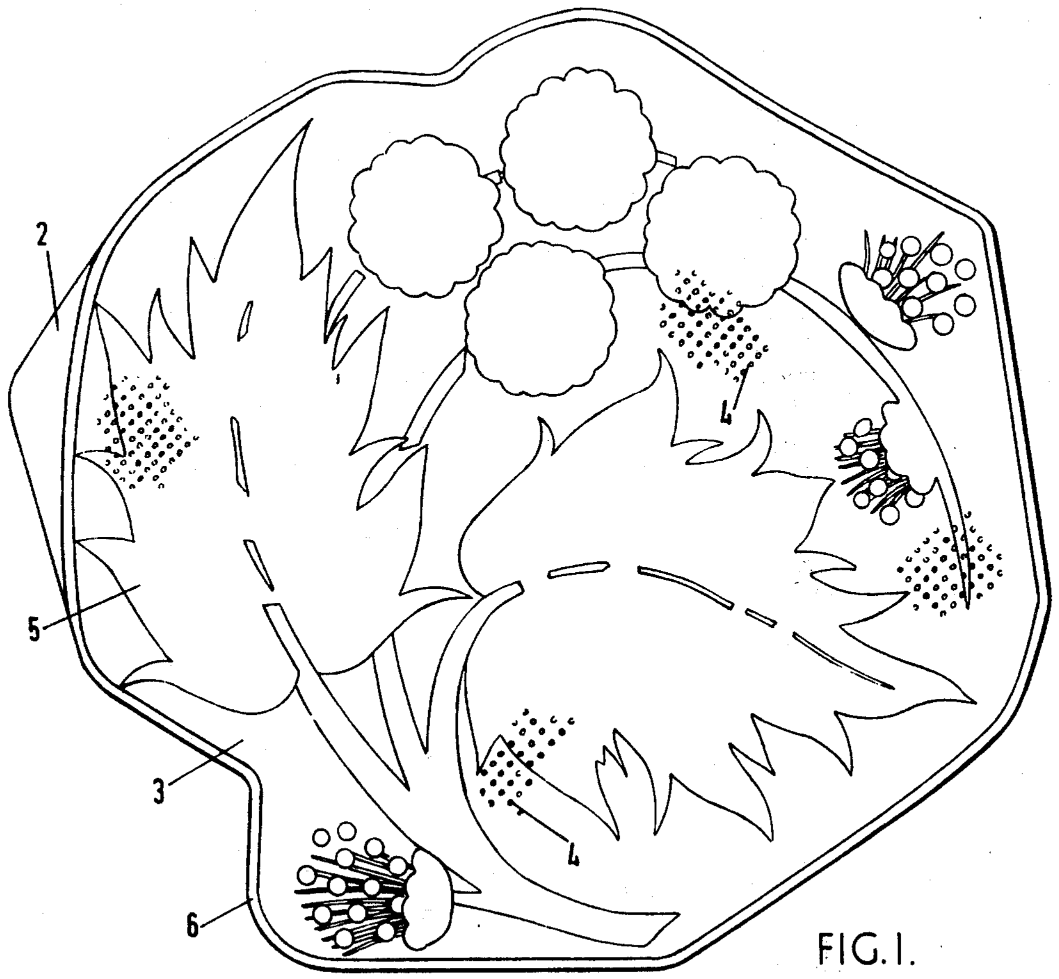
FIG. 1 is a plan view of a typical transfer to which the invention has been applied.
Figure 2:
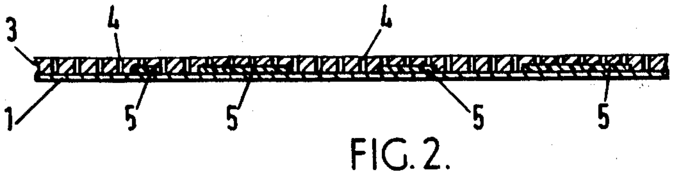
FIG. 2 is a diagrammatic section through the transfer of FIG. 1, to an enlarged scale.

FIGS. 1 and 2 show a base 1 of decal paper, which is shown in FIG. 1 as protruding as a tab 2 from beneath a cover coat 3 which has an all over printed mesh configuration illustrated by apertues 4.

Between the base 1 and the cover coat 3 there is a printed pattern 5 of glazes. The cover coat has a solid or unperforated peripheral zone 6. The pattern 5 is printed on the adhesive side of the base 1 and the cover coat 3 is applied by a coarse screen printing technique to achieve the apertured texture and by a fine screen printing to achieve the unapertured edge. The base is then trimmed to shape to conform with the shape of the cover coat 3, with the exception of the tab 2 for ease of handling.

In use, the transfer is soaked, as is conventional, in water to enable the cover coat 3 and pattern 5 to be slid off the base 1 and onto a smooth substrate, where it is flattened and dried by application of absorbent tissue rather than the conventional squeegeeing technique. The substrate and transfer are then fired, so that the cover coat is consumed and the glaze fuses into the surface of the substrate.

It has been found that the mesh form of cover coat is more flexible than a conventional cover coat, but needs to have greater mechanical strength than a conventional cover coat material. However, it can still be based on a xylene-soluble collodion provided that sufficient attention is paid to the need for mechanical strength. A suitable material is OPL 117 cover coat by Blythe Colours Limited of Stroke-on-Trent, England.

Figure 3:
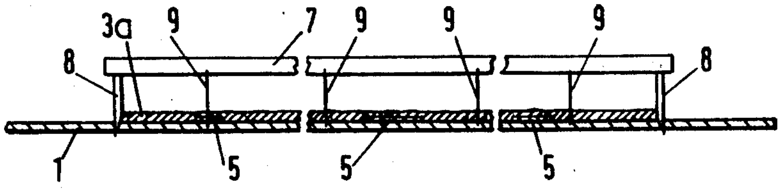
FIG. 3 is a section, similar to FIG. 2, illustrating an alternative form of transfer and showing a tool for providing such an alternative form.

FIG. 3 illustrates how instead of printing an apertured cover coat, a solidly printed cover coat may be pierced during trimming of the transfer. A trimming tool 7 has edge trimming knives to cut through the base 1 and cover coat if necessary. Within the edges defied by the knives 8, it is also provided with a pattern of fine sharp needles 9, spaced as required over the area covered by the pattern 5. The needles are arranged to pierce the cover coat 3*a* and pattern 5, but not right through the base 1, when the trimming tool is operated. This operation is known as kiss-cutting.

This type of transfer is more suitable for patterns 5 which do not have areas of fine detail, but instead are made up of large areas of solid colour and no colour.

Various modifications may be made within the scope of the invention.

I claim:

1. In a transfer of the type to be applied to a substrate and subsequently fired to obtain permanent marking of the substrate, and comprising a base having a surface of soluble adhesive onto an area of which is printed a pattern of one or more glazes, colours or pigments, and consumable cover coat covering the pattern area, said transfer being removed from said base by use of a solvent to free it from said soluble adhesive, the improvement comprising: said cover coat is provided with a configuration of small aperatures over substantially the whole of the pattern area, the size of said apertures varying according to a half toning technique wherein smaller apertures are utilized for fine pattern detail and vice versa, the cover coat being thus rendered porous but retaining its coherence to permit escape of solvent from behind the transfer without the necessity for squeegeeing.

* * * * *